June 29, 1926.
F. J. OAKES
COAL CUTTING CHAIN
Filed June 27, 1922    2 Sheets-Sheet 1
1,590,821
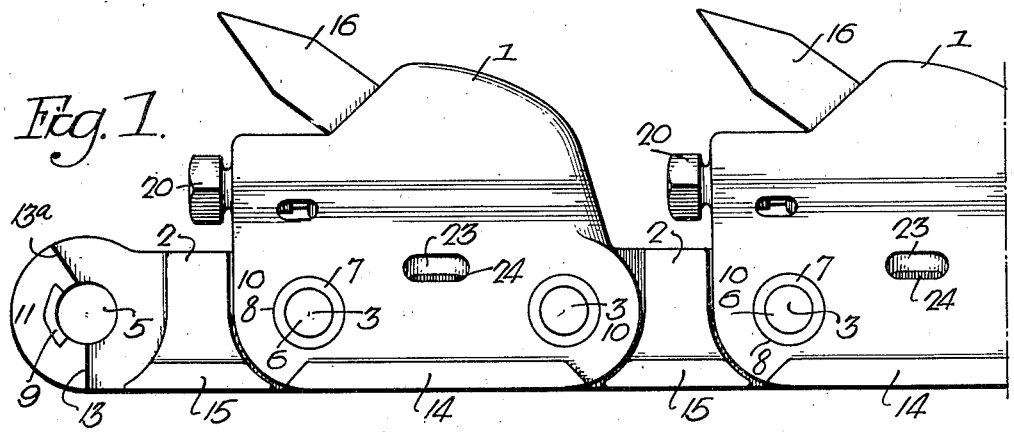
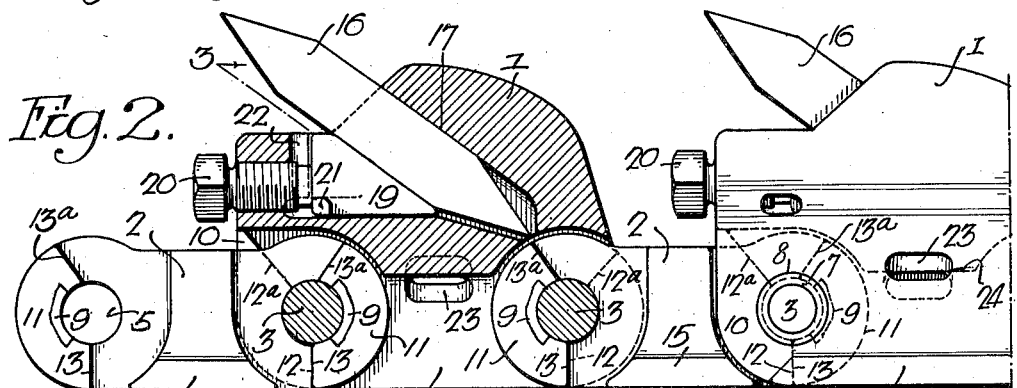
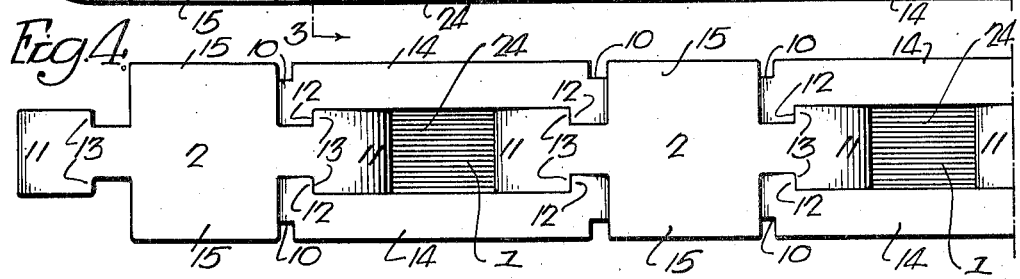
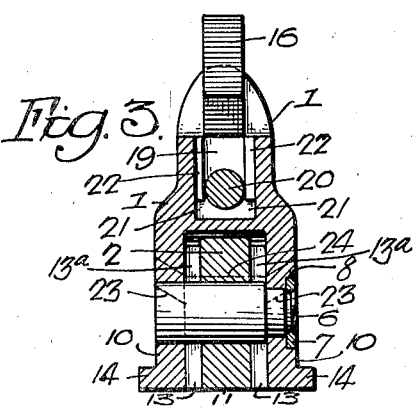
Inventor-
Frank J. Oakes.
by his Attorneys
Howson & Howson June 29, 1926.
F. J. OAKES
COAL CUTTING CHAIN
Filed June 27, 1922    2 Sheets-Sheet 2
1,590,821
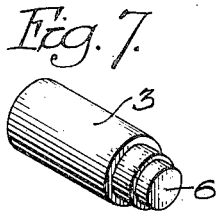
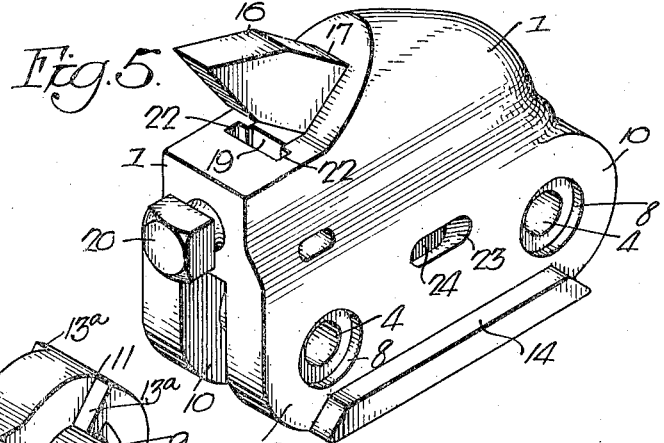
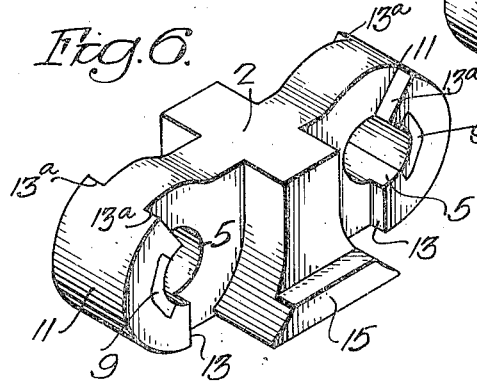
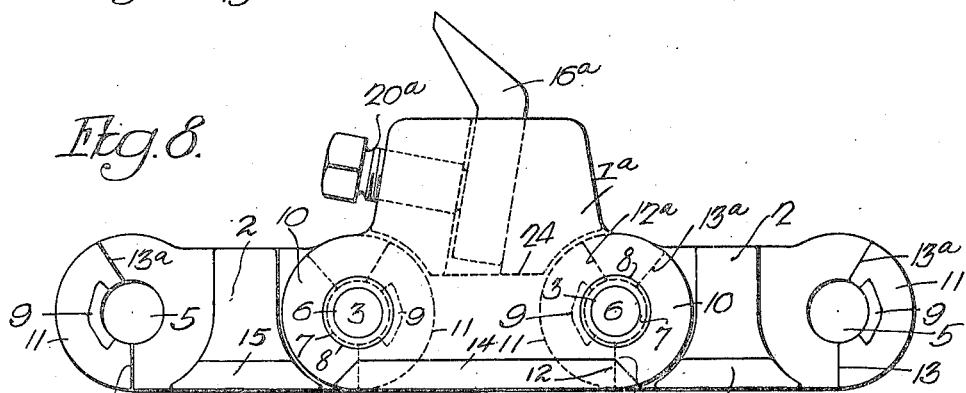
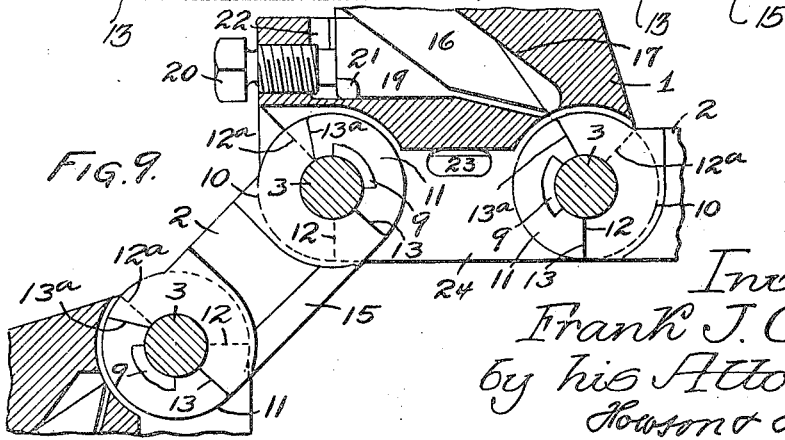
Inventor.—
Frank J. Oakes.
by his Attorneys.—
Howson & Howson Patented June 29, 1926.

1,590,821

UNITED STATES PATENT OFFICE.

FRANK J. OAKES, OF INDIANAPOLIS, INDIANA, ASSIGNOR TO LINK-BELT COMPANY, OF CHICAGO, ILLINOIS, A CORPORATION OF ILLINOIS.

COAL-CUTTING CHAIN.

Application filed June 27, 1922. Serial No. 571,218.

My invention relates to certain improvements in chains of the type used in cutting coal, in which certain links carry the cutting bits.

A further object of the invention is to provide the links carrying the cutting bits with extended bearings.

A still further object of the invention is to prevent the chain buckling when the bits strike the coal.

In the accompanying drawings:

Fig. 1 is a side view of a section of my improved cutting chain;

Fig. 2 is a side view, partly in section, showing a method of holding the bits;

Fig. 3 is a sectional view on the line 3—3, Fig. 2;

Fig. 4 is an inverted plan view showing the pockets for the teeth of the sprocket wheels;

Fig. 5 is a perspective view of a cutting link;

Fig. 6 is a perspective view of a connecting link;

Fig. 7 is a detached perspective view of one of the pivot pins;

Fig. 8 is a view of a modification of the invention; and

Fig. 9 is a longitudinal sectional view showing the chain bent.

1, 1 are the cutting links of the chain. 2 are the connecting links. The links are connected by pivot pins 3, shaped as shown in Fig. 7. The pivot pins extend through openings 4 in the cutting link and through openings 5 in the connecting link, as clearly shown in Fig. 3. The pin is reduced at 6 and the end is riveted over a washer 7 located in a recess 8 in one side of the cutting link so that the pin is secured to the cutting link and the connecting link turns on the pin.

In each opening 5 is a segmental bearing 9, shaped as shown in Figs. 2 and 6. This bearing is made of hard metal.

It will be noticed that the links 1 and 2 are interlocked at the pivot, as shown clearly in the inverted plan view, Fig. 4. Each cutting link has an enlargement 10 at each end, and each connecting link has an enlargement 11 at each end. These enlargements form shoulders 12 and 13 below the pivot, which are in contact when the chain is traveling in a straight line. The enlargements also form shoulders 12ª and 13ª, which come in contact with each other when the chain is flexed in passing around a sprocket wheel, or other curved object.

At each side of each cutting link is a bearing flange 14. On the connecting links are bearing flanges 15. The bearing flanges on the cutting links extend beyond the center of the pivots 3, providing a long bearing for the link so that it will resist any tendency to lift when the cutting bit is engaging the coal.

16 is a cutting bit, rectangular in cross section, in the present instance, and chisel pointed at both ends. The bit is adapted to a socket 17 in a cutting link, and a wedge block 19 bears against the under side of the bit. A set screw 20 forces the wedge 19 against the bit, clamping it against the wall of the socket. The wedge has laterally extending lugs 21, which travel in the ways in the link, as clearly shown in Fig. 3.

22 are vertical channels connecting with the ways, which permit the removal of the wedge on backing off the screw. The construction of the means for holding the cutting bits may be modified without departing from the essential features of the invention.

In Fig. 8, a modification is illustrated in which the cutting link 1ª is recessed to receive an angular bit 16ª, which is held by a set screw 20ª.

From the above construction, it will be seen that a substantial chain is provided, in which each link is made in a single piece with a wide bearing at the base. The pivot pins are so designed that they can be secured to the cutting links, which enables the connecting links to turn upon them. The pivot pins can be easily removed, when worn, and the bushing can be quickly replaced, when necessary.

In each side of each cutting link is an inclined passage 23, which communicates with a pocket 24 in the under side of the link into which a tooth of a sprocket wheel extends. The object of these passages is to prevent coal packing in the pockets, as any coal entering the pockets will be forced through the passages by the action of the sprocket teeth.

I claim:

1. The combination in a coal cutting chain, of a series of cutting links and a series of connecting links alternating with the cutting links and pivotally connected;

and cutting bits carried by the cutting links, the cutting links and the connecting links having extended side bearing flanges, the flanges of the cutting links extending to, or beyond, the pivots of the said links.

2. The combination in a coal cutting chain, of a series of cutting links alternating with a series of connecting links; pivot pins connecting the several links; and cutting bits carried by the cutting links, the two sets of links having segmental enlargements at the pivots forming shoulders, the lower shoulders abutting when the chain is straight, the other shoulders being arranged to abut when the chain is flexed in passing around a curve.

3. The combination in a coal cutting chain, of cutting links alternating with connecting links; and pivot pins for the several links, each cutting link having a bearing flange at each side of a greater length than the distance between the centers of the pivot pins.

FRANK J. OAKES.